US012571433B2

(12) United States Patent　　　　(10) Patent No.:　US 12,571,433 B2

Lin　　　　　　　　　　　　　　　　(45) Date of Patent:　　Mar. 10, 2026

(54) ELECTRONIC CONTROL CLUTCH STRUCTURE OF AN ACTUATOR DEVICE

(71) Applicant: TIMOTION TECHNOLOGY CO., LTD., New Taipei City (TW)

(72) Inventor: Yu-Chang Lin, New Taipei City (TW)

(73) Assignee: TIMOTION TECHNOLOGY CO., LTD., New Taipei City (TW)

( * ) Notice: Subject to any disclaimer, the term of this patent is extended or adjusted under 35 U.S.C. 154(b) by 0 days.

(21) Appl. No.: 19/073,025

(22) Filed: Mar. 7, 2025

(65) Prior Publication Data

US 2025/0320898 A1　　Oct. 16, 2025

Related U.S. Application Data

(60) Provisional application No. 63/634,492, filed on Apr. 16, 2024.

(51) Int. Cl.
| *F16D 23/12* | (2006.01) |
| *F16D 28/00* | (2006.01) |
| *F16D 121/24* | (2012.01) |
| *F16D 125/46* | (2012.01) |

(52) U.S. Cl.
CPC ............. *F16D 23/12* (2013.01); *F16D 28/00* (2013.01); *F16D 2023/123* (2013.01); *F16D 2121/24* (2013.01); *F16D 2125/46* (2013.01); *F16D 2300/08* (2013.01); *F16D 2300/18* (2013.01)

(58) Field of Classification Search
CPC .... F16D 2023/123; F16D 28/00; F16D 23/12; F16D 2121/24
See application file for complete search history.

(56) References Cited

U.S. PATENT DOCUMENTS

| 10,180,166 B2 * | 1/2019 | Grosskopf .............. F16D 23/12 |
| 11,415,219 B2 | 8/2022 | Sano et al. |
| 2013/0192418 A1 * | 8/2013 | Shigematsu .......... F16H 37/065 |
| | | 74/665 GB |

(Continued)

FOREIGN PATENT DOCUMENTS

| CN | 201685975 U | 12/2010 |
| CN | 102282390 A | 12/2011 |

(Continued)

*Primary Examiner* — Ernesto A Suarez
*Assistant Examiner* — Lillian T Nguyen
(74) *Attorney, Agent, or Firm* — HDLS IPR SERVICES; Chun-Ming Shih

(57) ABSTRACT

An electronic control clutch structure of an actuator device having a driver, a cam, a clutch wheel, and a transmission wheel is provided. The cam is connected to the driver, is driven by thereof, and includes a first actuating portion and a second actuating portion. The clutch wheel is connected to the rotating shaft, rotates with thereof, and is arranged atop on the cam. The cam operatively actuates the clutch wheel. The transmission wheel is connected to the rotating shaft. The clutch wheel and the transmission wheel are in a detached state when the clutch wheel is located on the first actuating portion. The clutch wheel and the transmission wheel are in an embedded state when the clutch wheel is located on the second actuating portion. The electronic control clutch structure may adapt uneven areas in the grass to perform weeding work according to the terrain changes of the grassland.

9 Claims, 9 Drawing Sheets

(56)                    References Cited

U.S. PATENT DOCUMENTS

| | | | |
|---|---|---|---|
| 2019/0116735 A1* | 4/2019 | Lang ...................... | B65B 13/26 |
| 2021/0148415 A1* | 5/2021 | Bolle ...................... | F16D 11/10 |

FOREIGN PATENT DOCUMENTS

| | | |
|---|---|---|
| CN | 107844044 A | 3/2018 |
| CN | 116816213 A | 9/2023 |
| JP | H0539865 A | 2/1993 |
| TW | M671363 U | 6/2025 |

* cited by examiner

ELECTRONIC CONTROL CLUTCH STRUCTURE OF AN ACTUATOR DEVICE

CROSS-REFERENCE TO RELATED APPLICATION

This patent application claims the benefit of U.S. Provisional Patent Application No. 63/634,492, filed Apr. 16, 2024, which is incorporated by reference herein.

BACKGROUND

Technical Field

The present disclosure relates to the technology of an actuator device, particularly to an electronic control clutch structure of the actuator device.

Description of Related Art

Lawn mowers are widely and commonly used on golf courses and various lawns for quick and large-scale weeding. When weeding, most people hope that a height of the cut grass may be even and flat.

However, the existing lawn mowers do not have a weeding function that may rise and fall according to the terrain of the lawn. Therefore, during weeding operations, a lawn mower blade rotating at high speed may cause residual weeds, body shakes, vibration, and difficulty in control due to the uneven point of force of the hoeing action. On the other hand, soil, rocks, grass branches, and debris often splash everywhere because of the high-speed rotation of the lawn mower blade, such that the user may often be accidentally injured by the splashing thereof.

In view of the above, the inventor seeks to overcome the aforementioned drawbacks associated with the current technology and aims to provide an effective solution through extensive researches along with utilization of academic principles and knowledge.

SUMMARY

The primary objective of the present disclosure is to provide an electronic control clutch structure of an actuator device that may adapt uneven areas in the grass to perform weeding work according to the terrain changes of the grassland by operating the electronic control clutch structure to the actuator device.

To accomplish the aforementioned objective, the present disclosure provides an electronic control clutch structure of an actuator device. The actuator device has a gear box and an electric motor. The electric motor has a rotating shaft. The electronic control clutch structure is arranged on the gear box, is corresponding to the electric motor, and includes a driver, a cam, a clutch wheel, and a transmission wheel. The driver is fixed to the gear box. The cam is connected to the driver and driven by the driver. The cam includes a first actuating portion and a second actuating portion. The clutch wheel is connected to the rotating shaft and rotating with the rotating shaft. A partial area of the clutch wheel is arranged atop on the cam. The cam operatively actuates the clutch wheel. The transmission wheel is connected to the rotating shaft and corresponding to the clutch wheel. The clutch wheel and the transmission wheel are in a detached state when the clutch wheel is located on the first actuating portion. The clutch wheel and the transmission wheel are in an embedded state when the clutch wheel is located on the second actuating portion.

The present disclosure may further perform an effect of clearly knowing whether the clutch wheel and the transmission wheel are in the detached state or the embedded state through arranging the signal sensor and the trigger body.

DETAILED DESCRIPTION

The technical contents of the present disclosure will become apparent with the detailed description of embodiments and the accompanied drawings as follows. However, it shall be noted that the accompanied drawings are for illustrative purposes only such that they shall not be used to restrict the scope of the present disclosure.

Figure 1:
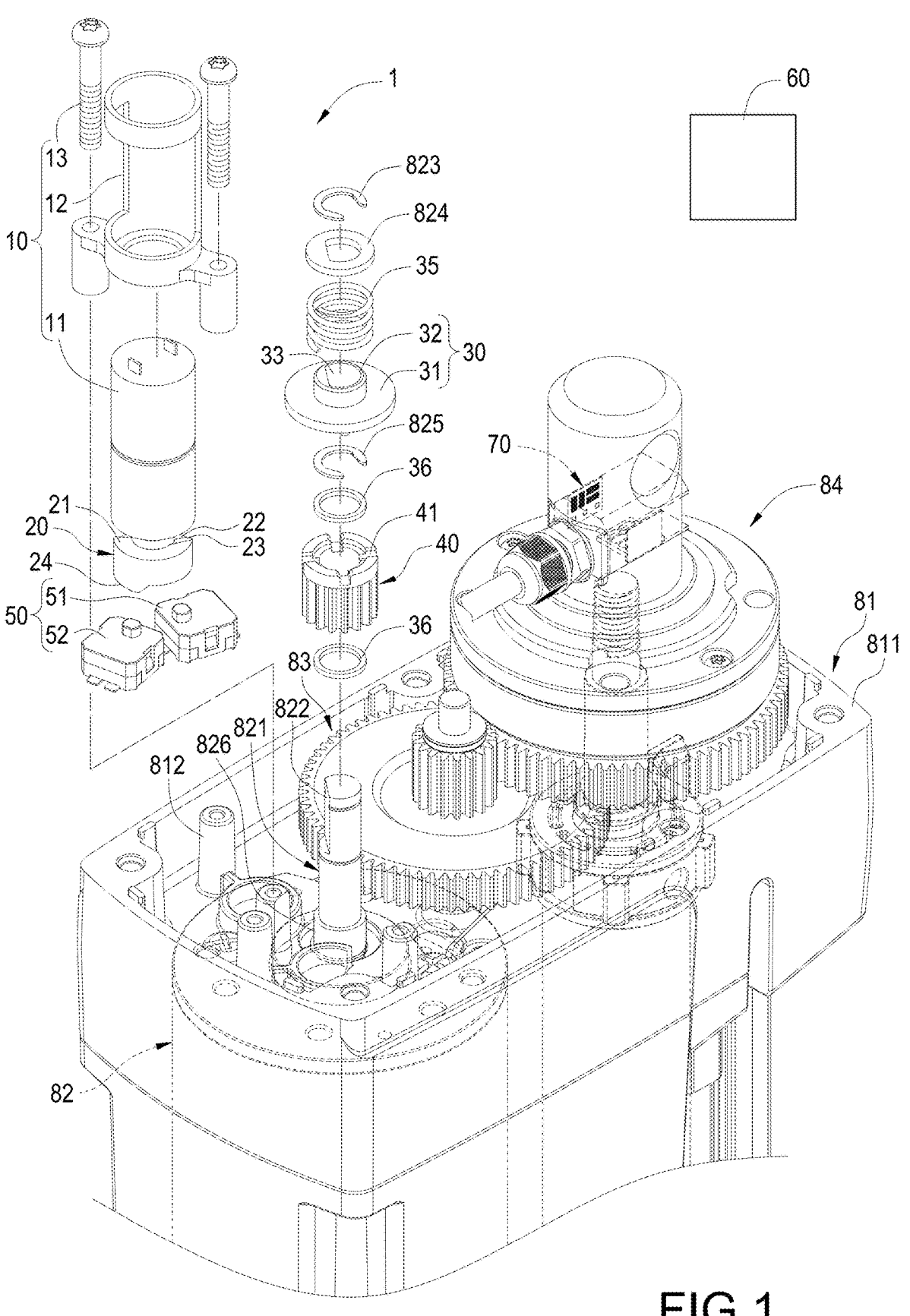
FIG. 1 is an exploded view of the electronic control clutch structure and the actuator device of the present disclosure.
Figure 2:
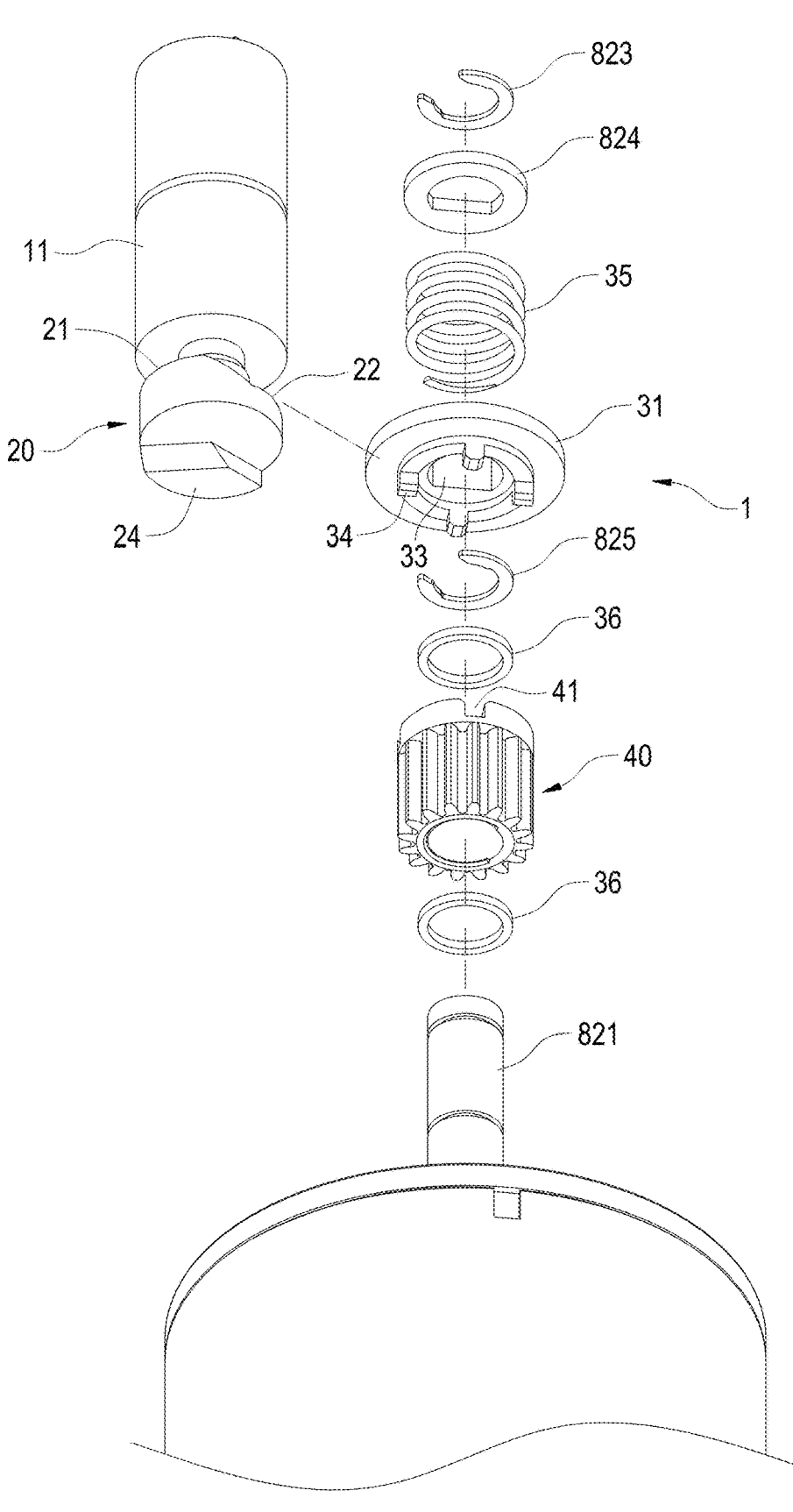
FIG. 2 is an exploded view of the electronic control clutch structure and the electric motor of the present disclosure.
Figure 3:
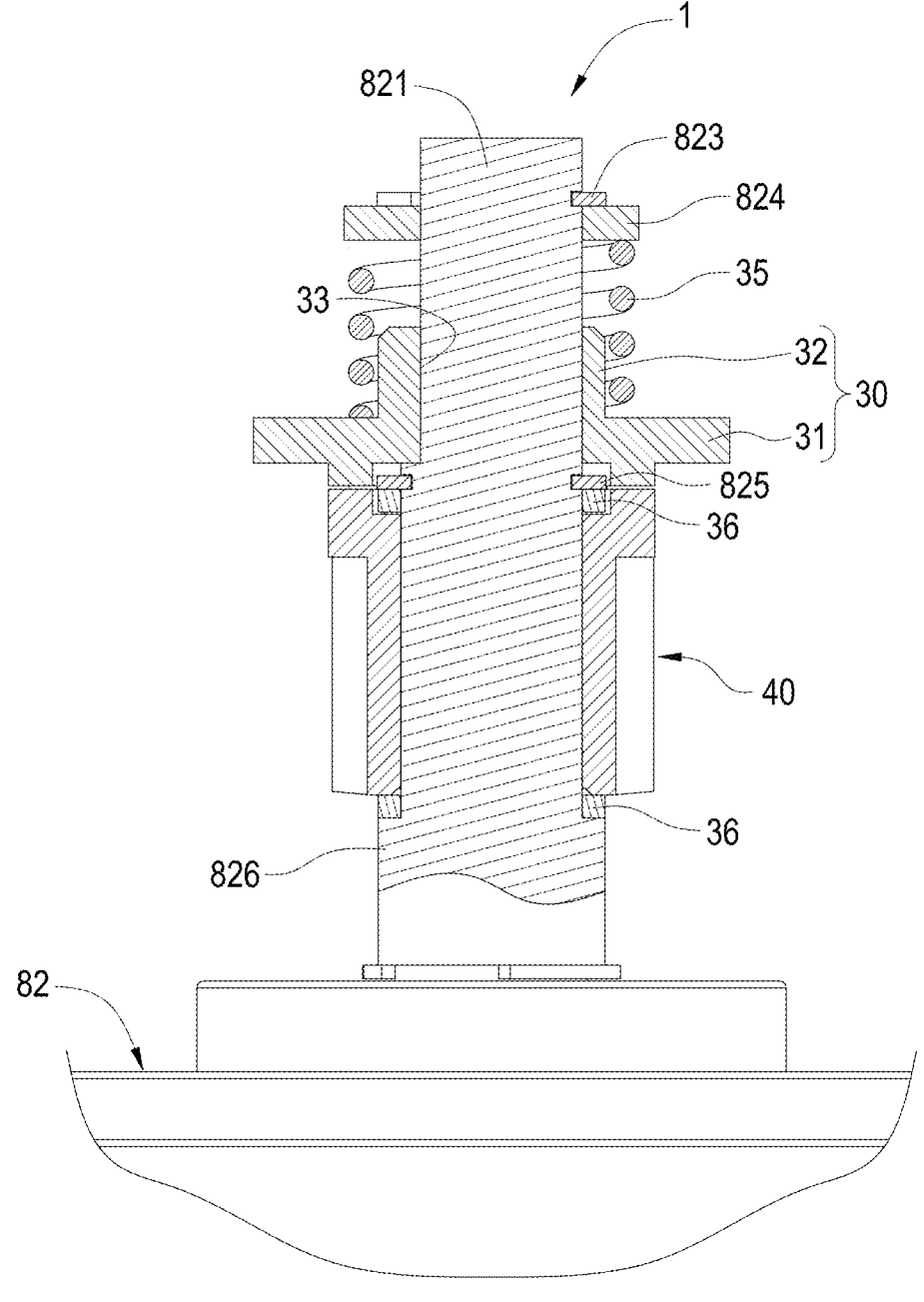
FIG. 3 is a cross-sectional side view of the electronic control clutch structure and the electric motor of the present disclosure.
Figure 4:
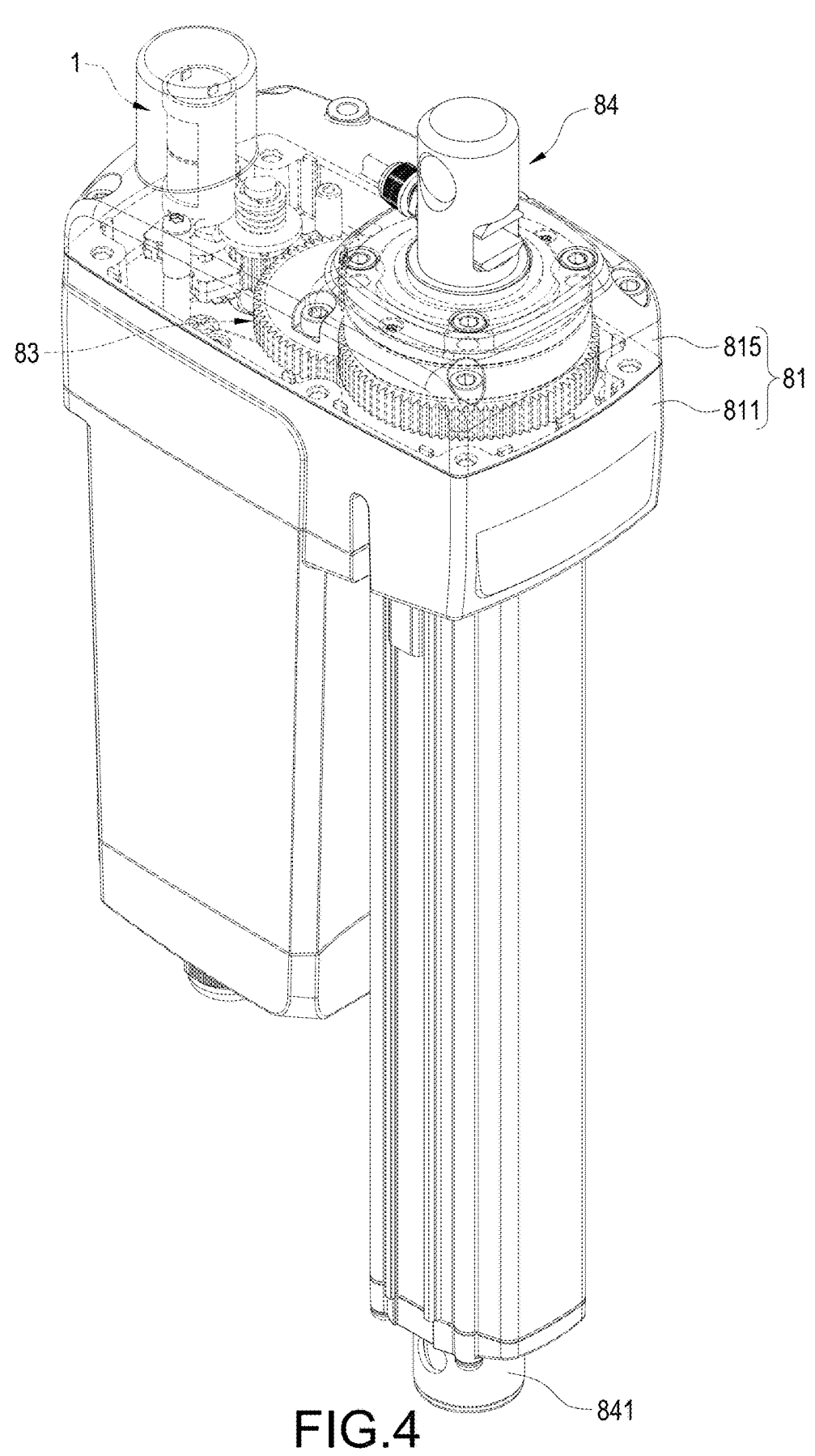
FIG. 4 is a perspective appearance view of the electronic control clutch structure and the actuator device of the present disclosure.
Figure 5:
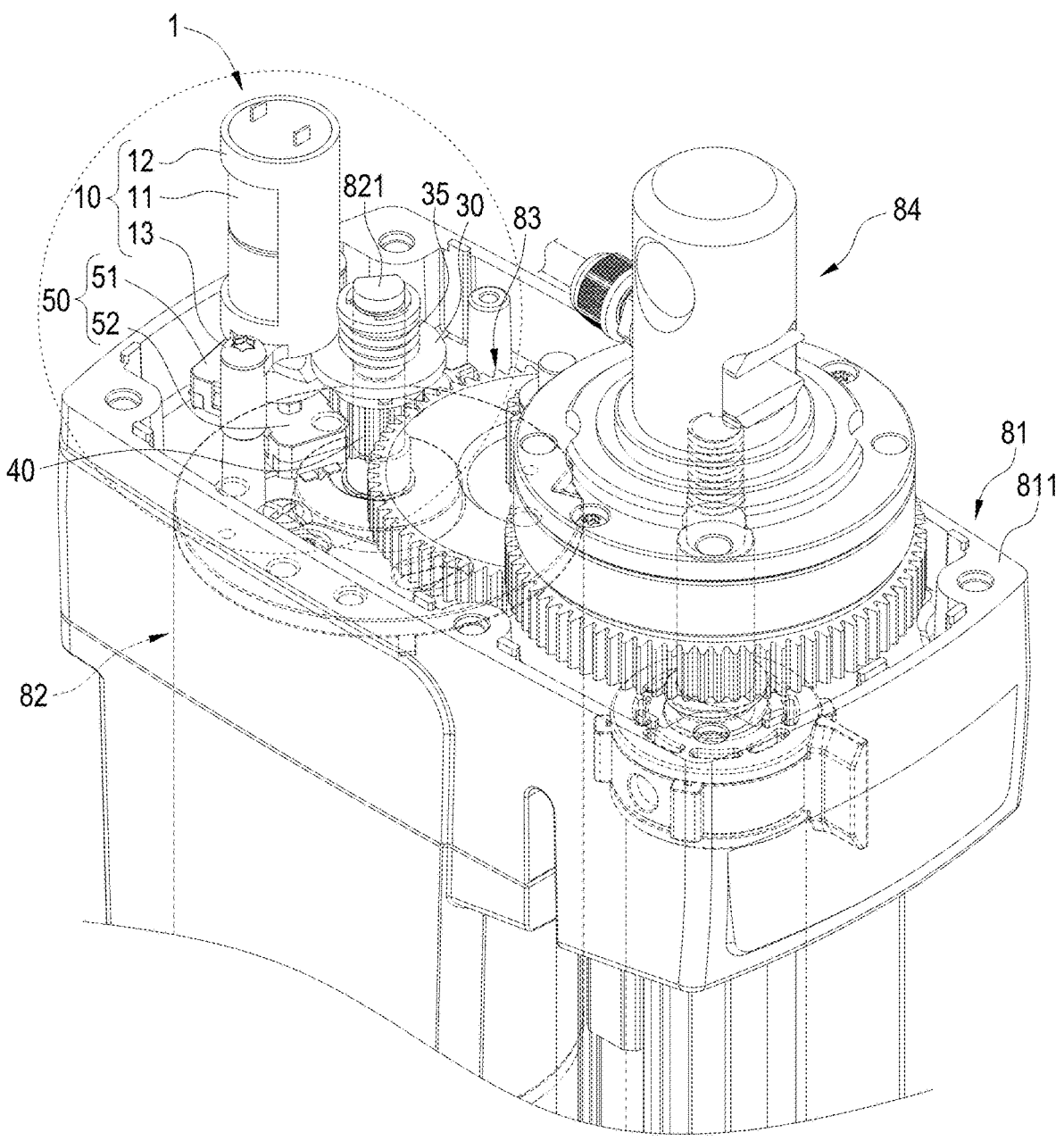
FIG. 5 is a partial perspective appearance view of the electronic control clutch structure and the actuator device of the present disclosure.

Please refer to FIG. 1, FIG. 2, FIG. 3, FIG. 4, and FIG. 5, the present disclosure provides an electronic control clutch structure of an actuator device. The actuator device 8 mainly includes a gear box 81, an electric motor 82, a speed reduction mechanism 83, a transmission mechanism 84, an electronic control clutch structure 1, and other related components or devices.

The gear box 81 mainly includes a seat 811 and a cover 815 correspondingly covering the seat 811. The speed reduction mechanism 83 is arranged on the seat 811 and includes a plurality of spur gears of different sizes. The electric motor 82 and the transmission mechanism 84 are mounted on the seat 811 and connected to the speed reduction mechanism 83 to achieve power transmission. The transmission mechanism 84 has a push rod 841 and related components. Since the related components are known technologies, the details thereof are not described.

The electronic control clutch structure 1 of the present disclosure is arranged on the gear box 81 and corresponding to the electric motor 82. The electronic control clutch structure 1 mainly includes a driver 10, a cam 20, a clutch wheel 30, and a transmission wheel 40.

The driver 10 mainly includes a motor body 11, a bracket 12, and a plurality of screw members 13. The seat 811 has a plurality of studs 812 arranged therein. The electric motor 82 has a rotating shaft 821. The bracket 12 is fixed in the seat 811 of the gear box 81 through being passed by the screw members 13. The motor body 11 is accommodated in the bracket 12, fixed to the bracket 12, and located on a side of the rotating shaft 821.

The cam 20 is connected to the motor body 11 and driven to rotate by the motor body 11. An upper end surface of the cam 20 defines a curved contour. The cam 20 mainly includes a first actuating portion 21, a second actuating portion 22, and two slopes 23. The first actuating portion 21 and the second actuating portion 22 are configured to be opposite to each other and form a height-staggered gap therebetween. The slopes 23 are respectively connected between the first actuating portion 21 and the second actuating portion 22. A trigger body 24 is extended from a lower end surface of the cam 20.

The clutch wheel 30 mainly includes a plate body 31 and a column body 32 extended from the plate body 31. A positioning hole 33 is defined at a central of the plate body 31 and the column body 32. A plurality of embedded blocks 34 is arranged on an end surface of the plate body 31 away from the column body 32. Partial area of the plate body 31 is arranged atop the curved contour of the cam 20. The cam 20 is operable to actuate the plate body 31 of the clutch wheel 30. The rotating shaft 821 has a positioning plane 822. The clutch wheel 30 is adapted to sheathe the positioning plane 822 of the rotating shaft 821 through the positioning hole 33 such that the clutch wheel 30 is driven to rotate by the rotating shaft 821.

The transmission wheel 40 is movably connected to the rotating shaft 821, located below the clutch wheel 30, and meshed with the speed reduction mechanism 83 for transmission. The transmission wheel 40 defines a plurality of embedded grooves 41 corresponding to the embedded blocks 34 of the clutch wheel 30, such that the embedded blocks 34 may be embedded with or detached from the embedded grooves 41. The description "is movably connected to" means that the transmission wheel 40 is free to rotate (or idle) when the transmission wheel 40 is detached from the clutch wheel 30 and the rotating shaft 821 and the clutch wheel 30 remain stationary.

In one of the embodiments, the electronic control clutch structure 1 of the present disclosure further includes a signal sensor 50. The signal sensor 50 is arranged in the gear box 81 and corresponding to the trigger body 24 of the cam 20. The signal sensor 50 mainly includes a first detection unit 51 and a second detection unit 52. When the clutch wheel 30 is detached from the transmission wheel 40, the first detection unit 51 is triggered by the trigger body 24. When the clutch wheel 30 is embedded to (meshed with) the transmission wheel 40, the second detection unit 52 is triggered by the trigger body 24.

In one of the embodiments, the electronic control clutch structure 1 of the present disclosure further includes a processor 60. The driver 10, the signal sensor 50, and the electric motor 82 are electrically connected to the processer 60.

In one of the embodiments, the electronic control clutch structure 1 of the present disclosure further includes a restoration spring 35. A first c-ring 823 and a gasket 824 are arranged on the rotating shaft 821. The first c-ring 823 is embedded in the rotating shaft 821 and abutted against to the gasket 824. The restoration spring 35 is adapted to sheathe an outer periphery of the column body 32 of the clutch wheel 30 and elastically clamped between the plate body 31 and the gasket 824.

In one of the embodiments, the electronic control clutch structure 1 of the present disclosure further includes two wear-resistant gaskets 36. A second c-ring 825 and a raised ring 826 are arranged on the rotating shaft 821. The second c-ring 825 is embedded in the rotating shaft 821. The wear-resistant gaskets 36 are adapted to sheathe the rotating shaft 821. One of the wear-resistant gaskets 36 is arranged between the raised ring 826 and the transmission wheel 40. The other one of the wear-resistant gaskets 36 is arranged between the transmission wheel 40 and the second c-ring 825.

In one of the embodiments, the electronic control clutch structure 1 of the present disclosure further includes a force detector 70. The force detector 70 is arranged on the transmission mechanism 84 and used to detect whether the push rod 841 bears a loading or a force.

Figure 6:
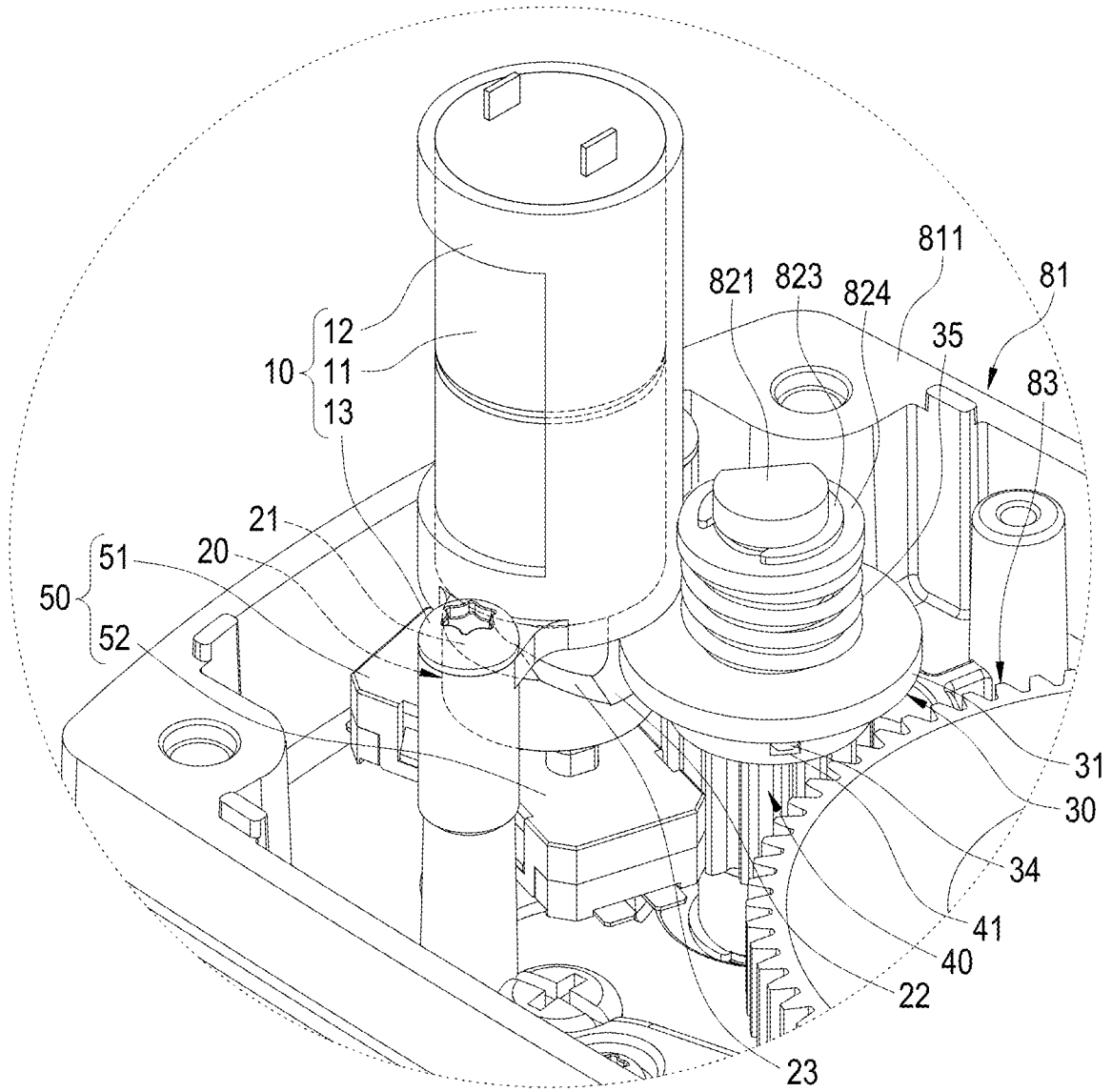
FIG. 6 is a partial perspective appearance view of the clutch wheel meshed with the transmission wheel of the present disclosure.
Figure 7:
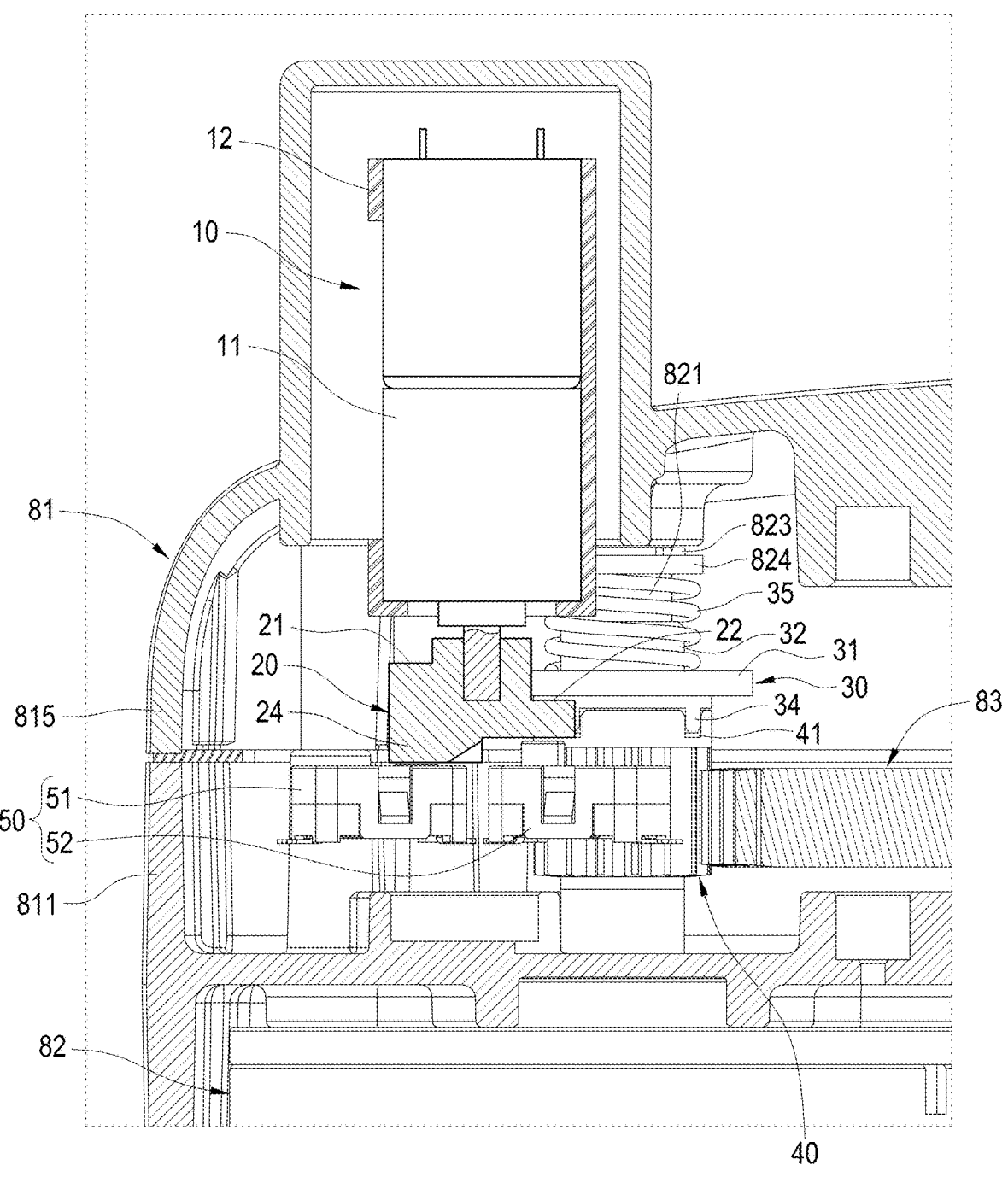
FIG. 7 is a cross-section view of the clutch wheel meshed with the transmission wheel of the present disclosure.
Figure 8:
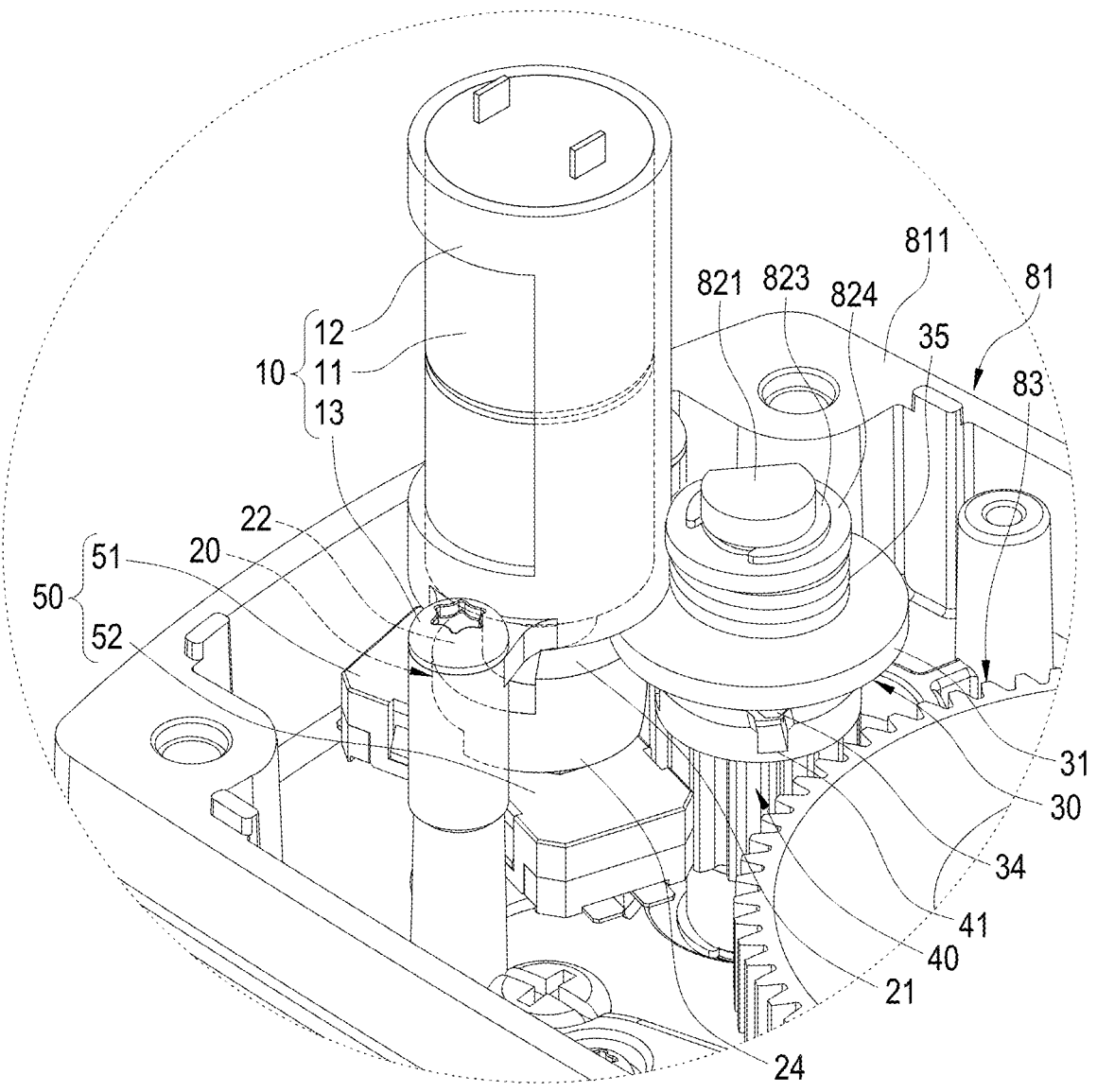
FIG. 8 is a partial perspective appearance view of the clutch wheel detached from the transmission wheel of the present disclosure.
Figure 9:
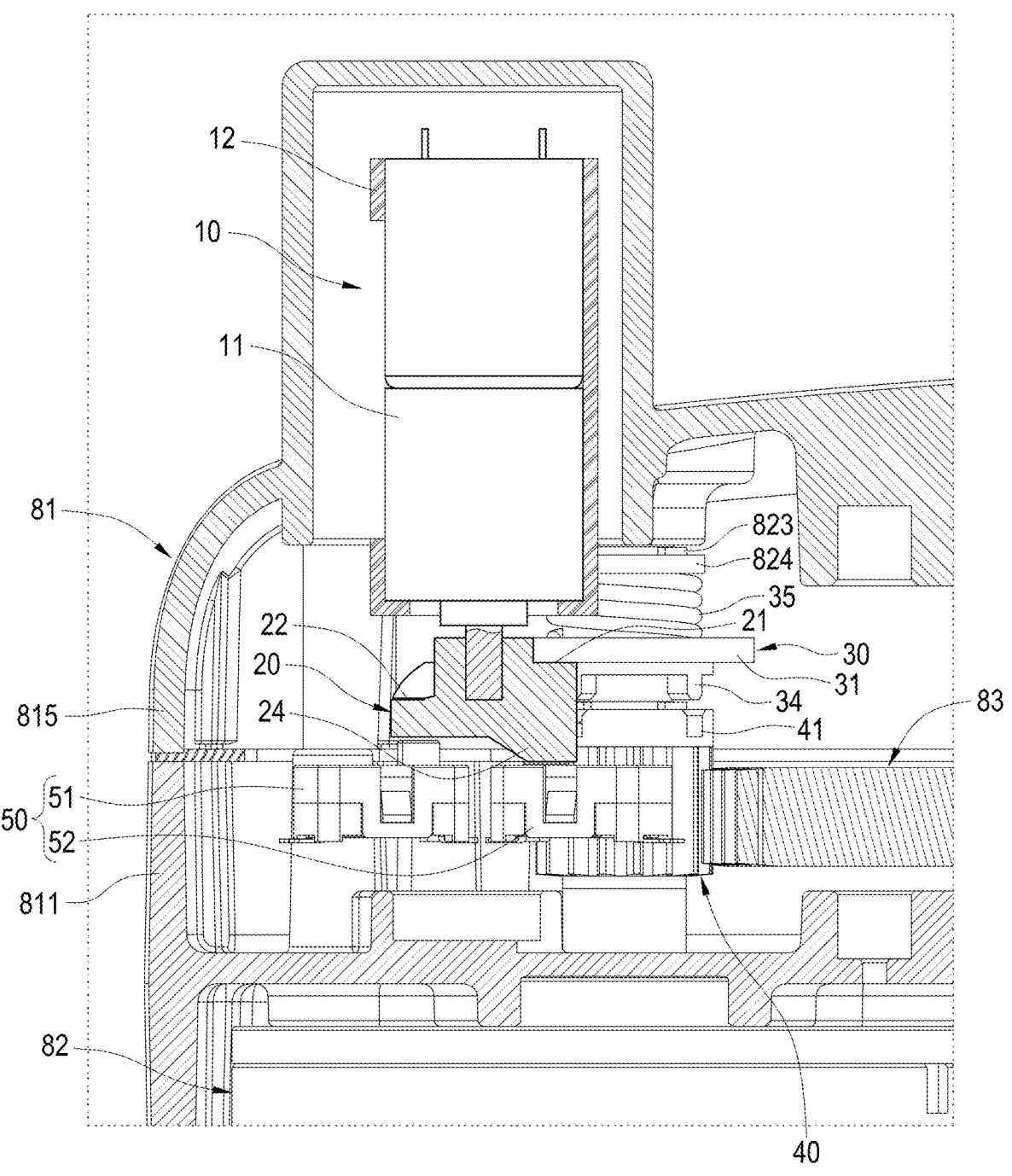
FIG. 9 is a cross-section view of the clutch wheel detached from the transmission wheel of the present disclosure.

Please refer to FIG. 6, FIG. 7, FIG. 8, and FIG. 9. When the push rod 841 of the transmission mechanism 84 extends toward to an upper-limited position in the using status, the user may press a button (not shown in figures) to output a control signal to the processor 60 to control the driver 10 to operate. The motor body 11 of the driver 10 drives the cam 20 to rotate, and the plate body 31 of the clutch wheel 30 is lifted by the first actuating portion 21 of the cam 20 to move upward to separate from the transmission wheel 40 (that is the embedded blocks 34 are detached from the embedded grooves 41 in a detached state). At the same time, the rotating shaft 821 remains stationary, the transmission wheel 40 is idling relative to the rotating shaft 821, and the trigger body 24 of the cam 20 rotates to trigger the first detection unit 51 to transfer a signal to the processer 60. When the processer 60 receives the signal showing that the clutch wheel 30 is detached from the transmission wheel 40, the processer 60 controls the electric motor 82 to stop operating such that the push rod 841 may be easily extended and moved under an action of external force. That is, when the actuator device 8 is applied to a lawn mower, the lawn mower may quickly adjust a height of a blade of the lawn mower to fit the ground according to the ups and downs of the site, so as to reduce unmown areas of turf.

After the push rod 841 is extended and moved, the user may press the button again to output another control signal to the processor 60 to control the driver 10 to operate. The motor body 11 of the driver 10 drives the cam 20 to rotate in an opposite direction, the plate body 31 of the clutch wheel 30 is located at the second actuating portion 22 of the cam 20 and moves downward by an elastic force of the restoration spring 35, and the embedded blocks 34 of the clutch wheel 30 are embedded into the embedded grooves 41 of the transmission wheel 40 (that is in an embedded state). At the same time, the clutch wheel 30 may drive the transmission wheel 40 to rotate, and the second detection unit 52 transfer an embedded signal showing that the embedded blocks 34 of the clutch wheel 30 are embedded into the embedded grooves 41 of the transmission wheel 40 to the processer 60 when the trigger body 24 of the cam 20 rotates to trigger the second detection unit 52. Then the processor 60 controls the electric motor 82 to operate for extending or retracting the push rod 841.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. An electronic control clutch structure of an actuator device, the actuator device comprising a gear box and an electric motor, the electric motor comprising a rotating shaft, the electronic control clutch structure arranged on the gear box and corresponding to the electric motor, the electronic control clutch structure comprising:

a driver, fixed to the gear box;

a cam, connected to the driver and driven by the driver, the cam) comprising a first actuating portion and a second actuating portion;

a clutch wheel, connected to the rotating shaft and rotating with the rotating shaft, a partial area of the clutch wheel arranged atop on the cam, the cam operatively actuating the clutch wheel; and a transmission wheel, connected to the rotating shaft and corresponding to the clutch wheel, wherein the clutch wheel and the transmission wheel are in a detached state when the clutch wheel is located on the first actuating portion, the clutch wheel and the transmission wheel are in an embedded state when the clutch wheel is located on the second actuating portion;

wherein the driver comprises a motor body, a bracket, and a plurality of screw members, the gear box comprises a plurality of studs arranged therein, the bracket is fixed to the studs through being passed by the screw members, the motor body is accommodated in and fixed to the bracket.

2. The electronic control clutch structure of the actuator device according to claim 1, wherein the clutch wheel comprises a plate body and a column body extended from the plate body, a positioning hole is defined at a central of the plate body and the column body, the rotating shaft comprises a positioning plane, the clutch wheel is adapted to sheathe the positioning plane through the positioning hole such that the clutch wheel is driven to rotate by the rotating shaft.

3. The electronic control clutch structure of the actuator device according to claim 2, wherein a plurality of embedded blocks is arranged on the plate body, the transmission wheel defines a plurality of embedded grooves embedded in or detached from the embedded blocks.

4. The electronic control clutch structure of the actuator device according to claim 1, further comprising a signal sensor, wherein the cam further comprises a trigger body, the signal sensor is arranged in the gear box and corresponding to the trigger body.

5. The electronic control clutch structure of the actuator device according to claim 4, wherein the signal sensor comprises a first detection unit and a second detection unit, the first detection unit is triggered by the trigger body when the clutch wheel and the transmission wheel are in the detached state, the second detection unit is triggered by the trigger body when the clutch wheel and the transmission wheel are in the embedded state.

6. The electronic control clutch structure of the actuator device according to claim 4, further comprising a processor, wherein the driver, the signal sensor, and the electric motor are electrically connected to the processer.

7. The electronic control clutch structure of the actuator device according to claim 1, further comprising a force detector, wherein the actuator device further comprises a transmission mechanism, the transmission mechanism comprises a push rod, the force detector is arranged on the transmission mechanism and used to detect whether the push rod bears a loading or a force.

8. An electronic control clutch structure of an actuator device, the actuator device comprising a gear box and an electric motor, the electric motor comprising a rotating shaft, the electronic control clutch structure arranged on the gear box and corresponding to the electric motor, the electronic control clutch structure comprising:

a driver, fixed to the gear box;

a cam, connected to the driver and driven by the driver, the cam) comprising a first actuating portion and a second actuating portion;

a clutch wheel, connected to the rotating shaft and rotating with the rotating shaft, a partial area of the clutch wheel arranged atop on the cam, the cam operatively actuating the clutch wheel;

a transmission wheel, connected to the rotating shaft and corresponding to the clutch wheel; and a restoration spring, wherein the rotating shaft comprises a first c-ring and a gasket, the first c-ring is embedded in the rotating shaft and abutted against to the gasket, the clutch wheel comprises a plate body and a column body extended from the plate body, the restoration spring is adapted to sheathe the column body and elastically clamped between the plate body and the gasket;

wherein the clutch wheel and the transmission wheel are in a detached state when the clutch wheel is located on the first actuating portion, the clutch wheel and the transmission wheel are in an embedded state when the clutch wheel is located on the second actuating portion.

9. The electronic control clutch structure of the actuator device according to claim 8, further comprising two wear-resistant gaskets, wherein the rotating shaft further comprises a second c-ring and a raised ring, the second c-ring is embedded in the rotating shaft, the two wear-resistant gaskets are adapted to sheathe the rotating shaft, one of the wear-resistant gaskets is arranged between the raised ring and the transmission wheel, the other one of the wear-resistant gaskets is arranged between the transmission wheel and the second c-ring.

* * * * *